United States Patent
Wang et al.

(10) Patent No.: US 9,063,919 B2
(45) Date of Patent: Jun. 23, 2015

(54) IMPROVING SERIAL PERIPHERAL PERFORMANCE OVER WIRELESS COMMUNICATION LINKS

(71) Applicant: QUALCOMM Incorporated, San Diego, CA (US)

(72) Inventors: Xiaodong Wang, San Diego, CA (US); Xiaolong Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/019,367

(22) Filed: Sep. 5, 2013

(65) Prior Publication Data
US 2014/0297905 A1    Oct. 2, 2014

Related U.S. Application Data (60) Provisional application No. 61/805,368, filed on Mar. 26, 2013.

(51) Int. Cl.
*G06F 3/00*     (2006.01)
*G06F 5/00*     (2006.01)
*G06F 13/24*    (2006.01)
*G06F 13/42*    (2006.01)

(52) U.S. Cl.
CPC ............... *G06F 13/24* (2013.01); *G06F 13/42* (2013.01)

(58) Field of Classification Search
None
See application file for complete search history.

(56) References Cited

U.S. PATENT DOCUMENTS

| | | | |
|---|---|---|---|
| 7,167,934 B1 | 1/2007 | Dunn et al. | |
| 7,209,470 B2* | 4/2007 | McGowan | 370/349 |
| 7,565,467 B2 | 7/2009 | Nagase | |
| 7,761,627 B2 | 7/2010 | Christison et al. | |
| 7,853,739 B1 | 12/2010 | Kupershmidt et al. | |
| 8,451,910 B1* | 5/2013 | Lohier et al. | 375/240.28 |
| 8,493,992 B2* | 7/2013 | Sella et al. | 370/445 |
| 2002/0167932 A1 | 11/2002 | McGowan | |
| 2008/0065794 A1 | 3/2008 | Lee et al. | |
| 2009/0172210 A1 | 7/2009 | Kesselman et al. | |
| 2010/0198999 A1 | 8/2010 | Nair et al. | |

FOREIGN PATENT DOCUMENTS

WO    2010007578 A1    1/2010

OTHER PUBLICATIONS

International Search Report and Written Opinion—PCT/US2014/019112—ISA/EPO—Aug. 25, 2014, 17 pp.
Partial International Search Report—PCT/US2014/019112—ISA/EPO—Jun. 23, 2014, 5 pp.
Second Written Opinion from corresponding PCT Application Serial No. PCT/US2014/019112 dated Feb. 19, 2015 (21 pages).

* cited by examiner

*Primary Examiner* — Elias Mamo
(74) *Attorney, Agent, or Firm* — Donald C. Kordich (57) ABSTRACT

A host device receives a Universal Serial Bus (USB) transfer request from a USB host driver, modifies the USB transfer request, encapsulates the modified USB transfer request for transmission via a wireless communication link, transmits the encapsulated modified USB transfer request to a wireless peripheral device via the wireless communication link, receives a transfer response that encapsulates a plurality of USB transfer responses from the wireless peripheral device via the wireless communication link, decapsulates the encapsulated transfer response, and transmits each of the plurality of USB transfer responses to the USB host driver.

56 Claims, 6 Drawing Sheets

IMPROVING SERIAL PERIPHERAL PERFORMANCE OVER WIRELESS COMMUNICATION LINKS

This application claims the benefit of U.S. Provisional Application No. 61/805,368, filed on Mar. 26, 2013, the entire content of which is incorporated herein by reference.

TECHNICAL FIELD

This disclosure relates to techniques for transmitting data between a host device and a wireless peripheral device over a wireless communication link.

BACKGROUND

Recently, various wireless communication technologies, such as the Institute for Electrical and Electronics Engineers (IEEE) 802.11x standards have gained popularity. Moreover, there has been a move to create wireless networking protocols that support higher throughput. One such protocol currently under development is the WiGig protocol, also referred to as IEEE 802.11ad, which may support multi-gigabit communication speeds between one or more WiGig-compatible devices. Other wireless protocols, such as IEEE 802.11ac, also support multi-gigabit speeds.

Wireless protocols may also support extensions, which may add additional capabilities that are not included as part of a wireless protocol's base standard. One object of an extension may be to enable transmission of various serial communication protocols, such as Universal Serial Bus (USB), over a wireless communication link without having to modify the existing USB drivers on the host device.

SUMMARY

In general, this disclosure relates to techniques for improving user experience when using peripherals, such as a mouse, over wireless communication links, such as the WiGig protocol and/or 802.11ac. More particularly, this disclosure relates to protocol extensions that provide the ability to encapsulate USB transfers from a host device and one or more wireless peripheral devices over a wireless communication link. In this manner, the extension may allow users of the wireless peripheral device to use wireless communication-compatible peripherals devices as though they are physically connected to the host device.

The latency associated with a wireless connection may pose problems for some devices such as mice, however. In some cases, the round trip time (RTT) between a host device and the peripheral may be as much as 20 milliseconds (msec). According to the USB specification, a wireless peripheral device operating in an interrupt mode, such as a mouse, must wait for a transfer request from the host device before replying with data, so the latency between transmitting a single mouse event, such as a mouse movement, may be as great as 20 msec. The wireless peripheral device may drop or buffer any captured events, e.g. mouse movements that occur between transferring a first captured event back to the host device, and receiving another transfer request from a host device.

Dropping captured device events or buffering captured events may lead to undesirable behavior, which users may not expect, such as a mouse cursor that skips around the screen, or that has an extremely delayed response time. The techniques of this disclosure modify the signaling techniques of wireless devices that utilize USB interrupt mode transfers so that captured device events are transferred more quickly between the host device and the peripheral device.

In one example, this disclosure describes a method which includes receiving, by a host device, a Universal Serial Bus (USB) transfer request from a USB host driver, modifying, by the host device, the USB transfer request, encapsulating, by the host device, the modified USB transfer request for transmission via a wireless communication link, transmitting, by the host device, the encapsulated modified USB transfer request to a wireless peripheral device via the wireless communication link, receiving, by the host device, a transfer response that encapsulates a plurality of USB transfer responses from the wireless peripheral device via the wireless communication link, decapsulating, by the host device, the encapsulated transfer response, and transmitting, by the host device, each of the plurality of USB transfer responses to the USB host driver.

In another example, this disclosure describes a method which includes receiving, by a wireless peripheral device, a transfer request that encapsulates a USB transfer request from a host device via a wireless communication link, capturing, by the wireless peripheral device, a plurality of events, responsive to receiving the transfer request, encapsulating, by the wireless peripheral device, the plurality of captured events in a transfer response, and transmitting, by the wireless peripheral device, the transfer response to a host device via a wireless communication link.

In another example, this disclosure describes a host device that includes a universal serial bus (USB) host driver, a host protocol adaptation layer (PAL), and a host network interface communicatively coupled to a wireless communication link, wherein the host device is configured to receive, with the host PAL, a Universal Serial Bus (USB) transfer request from the USB host driver, modify, by the host PAL, the USB transfer request, encapsulate, by the host PAL, the modified USB transfer request for transmission via the wireless communication link, transmit, by the host network interface, the encapsulated modified USB transfer request to a wireless peripheral device via the wireless communication link, receive, by the host network interface, a transfer response that encapsulates a plurality of USB transfer responses from the wireless peripheral device via the wireless communication link, decapsulate, by the host PAL, the encapsulated transfer response, and transmit, by the host PAL, each of the plurality of USB transfer responses to the USB host driver.

In another example, this disclosure describes a wireless peripheral device that includes a universal serial bus (USB) device controller, a peripheral protocol adaptation layer (PAL), a peripheral network interface communicatively coupled to a wireless communication link, wherein the wireless peripheral device is configured to receive, by the peripheral network interface, a transfer request that encapsulates a USB transfer request from a host device via the wireless communication link, capture, by the USB device controller, a plurality of events, responsive to receiving the transfer request, encapsulate, by the peripheral PAL, the plurality of captured events in a transfer response, and transmit, by the peripheral network interface, the transfer response to a host device via a wireless communication link.

In another example, this disclosure describes a host device comprising means for receiving a Universal Serial Bus (USB) transfer request from a USB host driver, means for modifying the USB transfer request, means for encapsulating the modified USB transfer request for transmission via a wireless communication link, means for transmitting the encapsulated modified USB transfer request to a wireless peripheral device via the wireless communication link, means for receiving a transfer response that encapsulates a plurality of USB transfer responses from the wireless peripheral device via the wireless communication link, means for decapsulating the encapsulated transfer response, and means for transmitting each of the plurality of USB transfer responses to the USB host driver.

In another example, this disclosure describes a wireless peripheral device comprising means for receiving a transfer request that encapsulates a USB transfer request from a host device via a wireless communication link, means for capturing a plurality of events responsive to receiving the transfer request, means for encapsulating the plurality of captured events in a transfer response, and means for transmitting the transfer response to a host device via a wireless communication link.

In another example, a non-transitory computer readable storage medium comprises instructions stored thereon that, when executed, cause one or more processors of a host device to receive, by the host device, a Universal Serial Bus (USB) transfer request from a USB host driver, modify, by the host device, the USB transfer request, encapsulate, by the host device, the modified USB transfer request for transmission via a wireless communication link, transmit, by the host device, the encapsulated modified USB transfer request to a wireless peripheral device via the wireless communication link, receive, by the host device, a transfer response that encapsulates a plurality of USB transfer responses from the wireless peripheral device via the wireless communication link, decapsulate, by the host device, the encapsulated transfer response, and transmit, by the host device, each of the plurality of USB transfer responses to the USB host driver.

In another example, a non-transitory computer readable storage medium comprises instructions stored thereon that, when executed, cause one or more processors of a wireless peripheral device to receive, by the peripheral device, a transfer request that encapsulates a USB transfer request from a host device via a wireless communication link, capture, by the peripheral device, a plurality of events, responsive to receiving the transfer request, encapsulate, by the peripheral device, the plurality of captured events in a transfer response, and transmit, by the peripheral device, the transfer response to a host device via a wireless communication link.

The details of one or more examples are set forth in the accompanying drawings and the description below. Other features, objects, and advantages will be apparent from the description and drawings, and from the claims.

DETAILED DESCRIPTION

Figure 1:
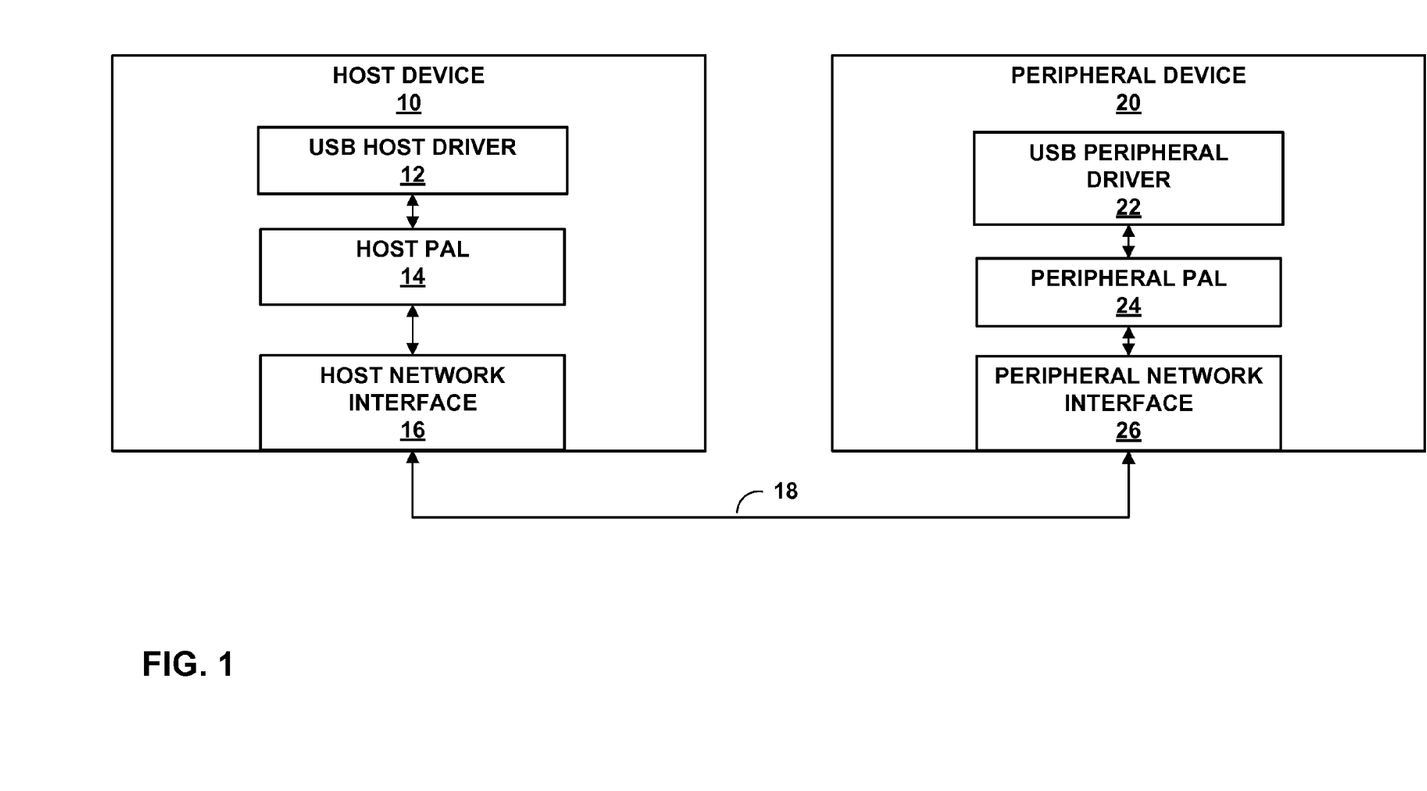
FIG. 1 is a block diagram illustrating a host device and a wireless peripheral device that are communicatively coupled over a wireless communication link in accordance with the techniques of this disclosure.

FIG. 1 is a block diagram illustrating a host device and a wireless peripheral device that are communicatively coupled over a wireless communication link in accordance with the techniques of this disclosure. FIG. 1 includes a host device 10, which includes Universal Serial Bus (USB) host driver 12 and host Protocol Adaptation Layer (PAL) 14. FIG. 1 also includes wireless peripheral device 20, which further includes USB peripheral driver 22 and peripheral PAL 24. Host device 10 may comprise a computing device, such as a smartphone, tablet, PC, laptop, nettop, TV, or other wireless-enabled device.

In the example of FIG. 1, host device 10 and wireless peripheral device 20 are communicatively coupled over wireless communication link 18. Communication link 18 may comprises a wireless communication link, such as a WiGig link (also referred to as IEEE 802.11ad), an 802.11a/b/g/ac link, or another wireless link which supports bidirectional wireless communication. Communication link 18 may support extensions, some of which may support USB interrupt mode transfers in accordance with the techniques of this disclosure.

One aim of some wireless extensions is to support transmission of various serial protocols, such as USB over a wireless communication link without modification of a host driver or a device controller, or host or device drivers. In this manner, a USB controller, e.g., USB host driver 12 may send and receive USB requests to and from host PAL 14, which may encapsulate the USB requests and host network interface 16 may transmit them to peripheral network interface 26 over communication link 18 without requiring host USB host driver 12 to modify a USB request. Similarly, peripheral PAL 24 may transmit and receive USB transfers to and/or from peripheral network interface 26 without requiring USB peripheral driver 22 to modify the USB transfers.

Host PAL 14 and peripheral PAL 24 (PALs 14, 24) are responsible for formatting data for transmission over wireless communication link 18 using host network interface 16 and peripheral network interface 26, as well as formatting received data from host network interface 16 and peripheral network interface 26 (network interfaces 16 and 26) to be compatible with USB host driver 12 and USB peripheral driver 22. PALs 14 and 24 may modulate and demodulate data in a format compatible with wireless transmission, which network interfaces 16 and 26 may transmit via wireless communication link 18. In accordance with the techniques of this disclosure, PALs 14 and 24 may receive transfer requests from USB host driver 12 and USB peripheral driver 22, respectively, as well as encapsulated USB requests or responses over communication link 18. Host PAL 14, and peripheral PAL 24 may modify the USB transfer requests and responses in some cases.

As one example, wireless peripheral device 20 may comprise a device that operates in accordance with the USB interrupt transfer mode. As one example, wireless peripheral device 20 may comprise a wireless mouse, which is compatible with wireless communication, and may also support a serial extension for communicating using serial, e.g. USB communication over a wireless communication link. Other types of peripheral devices may also benefit from the techniques described herein, and a wireless mouse is merely one illustrative example. Typically, a wireless mouse transmits events, e.g., clicks and movement events using the USB interrupt transfer mode. During USB interrupt transfers, a host device sends a transfer request, and the wireless peripheral device (e.g., the wireless mouse) transmits a transfer response. Generally speaking, the host device waits for the response from the peripheral before transmitting another transfer request to the device, and the peripheral waits for a transfer request before transmitting any transfer responses to the host device.

For wired peripherals communicating using the USB interrupt transfer mode, such as wired mice, the transmission latency of the USB interrupt transfer mode over the USB cable is low enough that the transfer requests from the host and responses from the peripheral device occur rapidly, and the user does not notice any lag associated with the USB interrupt transfers. However, when communicating using a wireless communication link, the latency between the transmission of one message, and its receipt may be as great as 10 milliseconds (msec). Thus, host PAL 14 may receive a transmission of an event indicated by a USB response request from peripheral PAL 24 10 msec after the response request was sent by peripheral PAL 24. Similarly, there may be 10 msec of latency associated with a request transfer from Host PAL 14 to peripheral PAL 24. In this example, the total roundtrip time (RTT) between host device 10 and wireless peripheral device 20 may be 20 msec.

If traditional request-response signaling is used in accordance with the USB specification, undesirable behavior may occur when utilizing peripherals that send many events, e.g., a mouse. After peripheral PAL 24 receives a first transfer request, it may take up to 10 msec for host PAL 14 of host device 10 to receive the transfer response from wireless peripheral device 20, and another 10 msec for peripheral PAL 24 to receive another transfer request from host PAL 14 requesting another event.

Between sending a transfer response, and waiting for a subsequent transfer request from host PAL 14, wireless peripheral device 20, if configured in accordance with conventional techniques, may be unable to transmit any additional captured events. Any events that wireless peripheral device 20 captures while waiting for a subsequent transfer request from host device 10 can be buffered, and sent at a later time, or dropped completely.

In the case that wireless peripheral device 20 captures the events while waiting for a response, the wireless peripheral device has to include additional hardware to store the queued events. If enough events are captured but cannot be sent due to the RTT of communication link 18, the queue of wireless peripheral device 20 may fill up, and wireless peripheral device 20 may still be forced to drop some captured events. Even if the queue does not fill up, the host device may receive the events, e.g. movement events, at a much later time than when the user of wireless peripheral device 20 inputted the movements, which may cause the movements to have unacceptable amounts of lag to the user.

In the case that wireless peripheral device 20 drops the captured events because peripheral PAL 24 has not received another request for events due to the latency of communication link 18, wireless peripheral device 20 may not transmit the dropped events to host device 10. In such cases, because host device 10 never receives the dropped events, and only receives some of the captured events, a cursor corresponding to the mouse, may appear to move erratically across an output device, such as a monitor or touchscreen, which is also undesirable behavior for a user of host device 10.

This disclosure is directed to techniques for dealing with the latency associated with transmitting USB interrupt messages for peripherals, such as mice. The techniques of this disclosure may modify the standard USB interrupt transfer signaling patterns such that when host PAL 14 receives a USB interrupt request, host PAL 14 modifies the USB transfer request to include multiple USB transfer requests, encapsulates the multiple requests, and transmits them to peripheral PAL 24.

Similarly, peripheral PAL 24 receives the multiple encapsulated transfer requests from host PAL 14, decapsulate the transfer requests, and transfers them, one at-a-time, to USB peripheral driver 22. USB peripheral driver 22 transmits multiples USB responses, one at-a-time, to peripheral PAL 24, which encapsulates the multiple responses, and transmits the multiple encapsulated USB responses to host PAL 14. Host PAL 14 decapsulates the multiple encapsulated USB responses, and transmits them, one at-a-time, to USB host driver 12, which then processes the events indicated by the USB response transfers. By utilizing PALs 14, 24 to request and encapsulate multiple USB responses, multiple captured peripheral events can be sent simultaneously, increasing the throughput for events of wireless communication link 18.

In some additional examples, host PAL 14 may similarly request encapsulated USB requests for events from peripheral PAL 24. However, before receiving a first response from peripheral PAL 24 that includes multiple USB responses, host PAL 14 may transmit an additional request that includes multiple encapsulated USB transfer requests to peripheral PAL 24 such that the additional request arrives just as peripheral PAL 24 transmits the response to the first request from host PAL 14.

Thus, in accordance with the techniques of this disclosure, host device 10 may be configured to receive, by host PAL 14, a Universal Serial Bus (USB) transfer request from USB host driver 12, modify, by host PAL 14, the USB transfer request, encapsulate, by host PAL 14, the modified USB transfer request for transmission via wireless communication link 18 transmit, by network interface 16, the encapsulated modified USB transfer request to a wireless peripheral device via wireless communication link 18, receive, by network interface 16, a transfer response that encapsulates a plurality of USB transfer responses from wireless peripheral device 20 via wireless communication link 18, decapsulate, by host PAL 14, the encapsulated transfer response, and transmit, by host PAL 14, each of the plurality of USB transfer responses to USB host driver 12.

In another example in accordance with the techniques of this disclosure, wireless peripheral device 20 may be configured to receive, by peripheral network interface 26, a transfer request that encapsulates a USB transfer request from host device 10 via wireless communication link 18, capture, by USB peripheral driver 22, a plurality of events, responsive to receiving the transfer request, encapsulate, by peripheral PAL 24, the plurality of captured events in a transfer response, and transmit, by peripheral network interface 26, the transfer response to host device 10 via wireless communication link 18.

Figure 2:
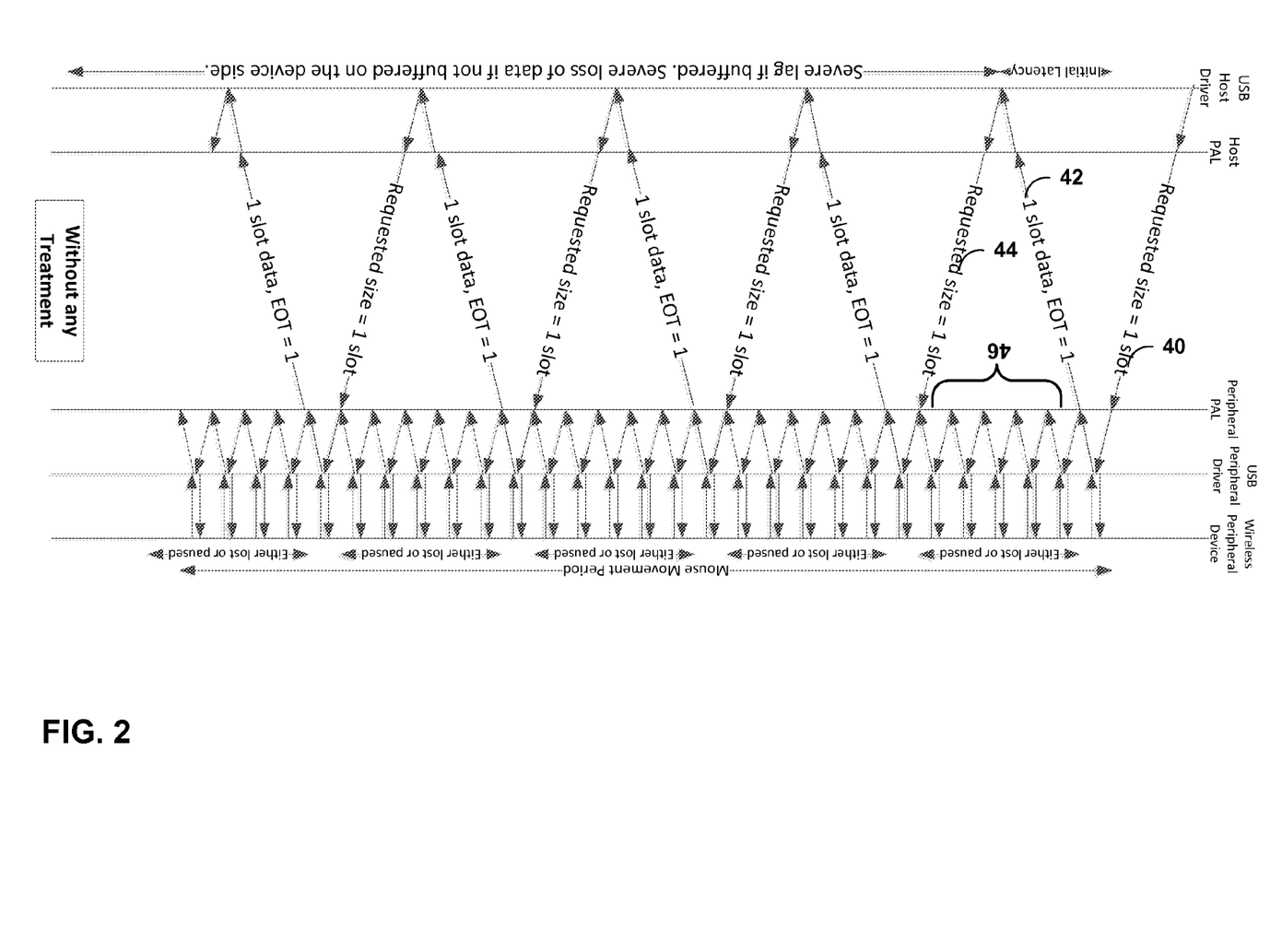
FIG. 2 is a conceptual diagram illustrating an example of transmitting serial data over a wireless communication link as taught by the prior art.

FIG. 2 is a conceptual diagram illustrating an example of transmitting serial data over a wireless communication link as taught by the prior art. In the example of FIG. 2, a wireless peripheral device (e.g., wireless peripheral device 20 of FIG. 1) is wirelessly connected to a USB host device (e.g., USB host device 10) over a wireless communication link (e.g., wireless communication link 18). The host device generates a request for a USB interrupt response corresponding to a mouse event, such as a movement, and transmits the request to the wireless peripheral device (40). Wireless peripheral device 20 responds with the single requested encapsulated USB response transfer, which indicates a mouse movement (42).

However, the wireless peripheral device may not be able to send any additional mouse movements until the wireless peripheral device receives another transfer request from the host device (44). The wireless peripheral device may still capture additional mouse movements during time period 46 after sending the transfer response (42), and receiving the subsequent response (44). The wireless peripheral device is forced to either buffer or drop the captured events, which results in undesirable effects for a user of the wireless peripheral device and the host device.

Figure 3:
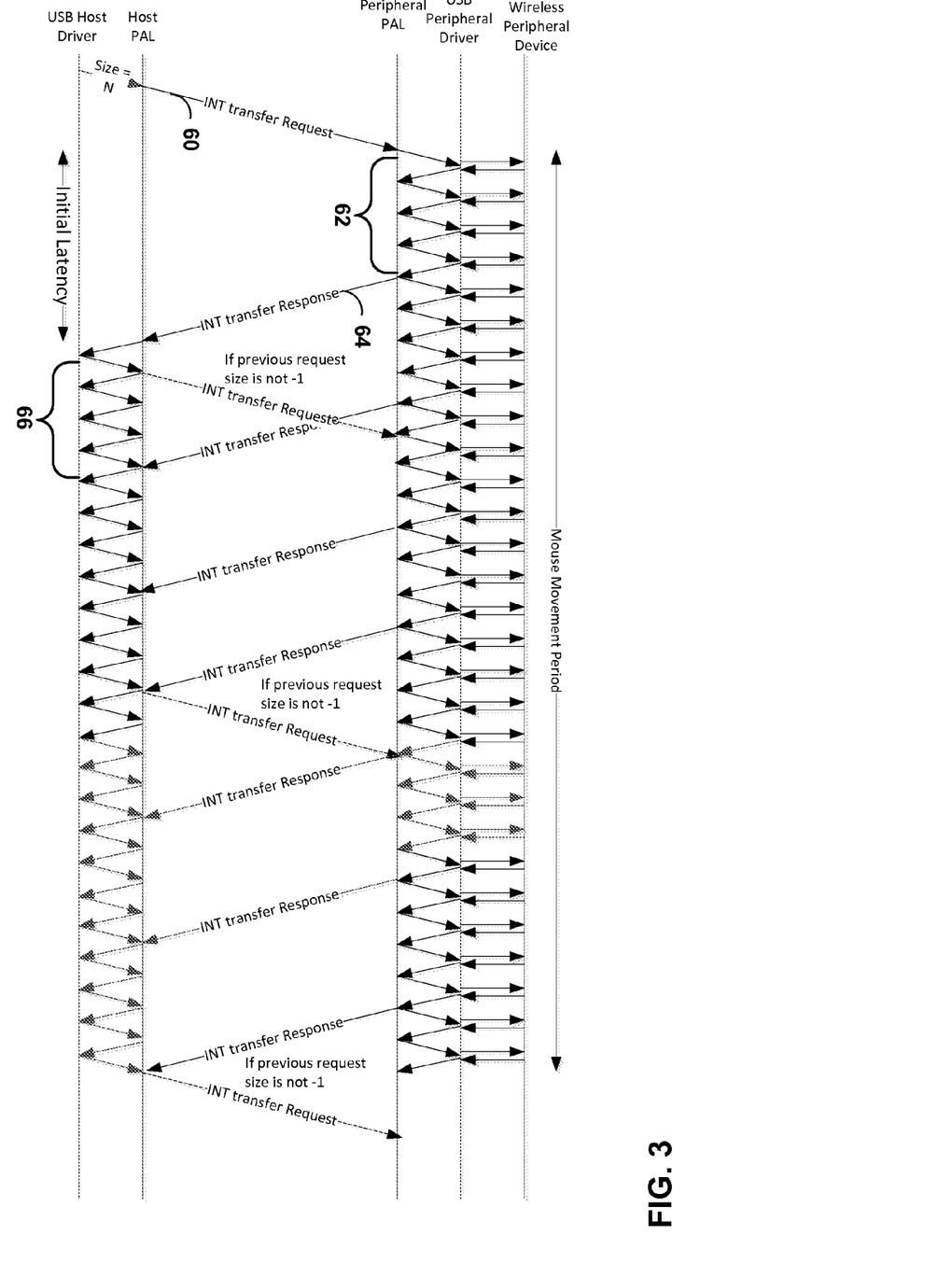
FIG. 3 is a conceptual diagram illustrating a technique for improving wireless USB interrupt mode transfers in accordance with the techniques of this disclosure.

FIG. 3 is a conceptual diagram illustrating a technique for improving wireless USB interrupt mode transfers in accordance with the techniques of this disclosure. In the example of FIG. 3, a host device, e.g. host device 10 of FIG. 1 is communicatively coupled to a peripheral device, e.g. wireless peripheral device 20 of FIG. 1. Host device 10 may comprise a device, such as a smartphone, tablet, PC, laptop, nettop, TV, or other wireless-enabled device. Wireless peripheral device 20 may comprise a peripheral device, such as a mouse. Host device 10 and wireless peripheral device 20 are communicatively coupled using a wireless link, such as WiGig, 802.11ac, etc. Host device 10 and wireless peripheral device 20 may communicate with each other using the USB interrupt transfer mode over the wireless link.

For the purposes of example, host device 10 may have enumerated the device descriptors of wireless peripheral device 20 to establish a USB interrupt transfer mode connection. Host device 10 and wireless peripheral device 20 may have determined various connection parameters, such as a polling rate that host device 10 uses when periodically polling wireless peripheral device 20 for data, such as events captured by wireless peripheral device 20. In general, host device 10 periodically polls wireless peripheral device 20 at the polling rate specified in the device descriptor of wireless peripheral device 20.

Whenever host device 10 polls wireless peripheral device 20, host device 10 transmits an "IN" data packet, which may be referred to in this disclosure as a transfer request in some examples of this disclosure. Assuming the IN data packet is not corrupt and that an interrupt is present on wireless peripheral device 20, USB peripheral driver 22 of wireless peripheral device 20 responds to host device 10 with an RESP" data packet, which may be referred to in this disclosure as a transfer response. As discussed above, all of the USB packets described herein may be transmitted over wireless link communication 18.

In the example of FIG. 3, a USB host driver of a host device, e.g., USB host driver 12 of host device 10 generates an interrupt transfer request, and transmits the request to a host PAL, host PAL 14. In some examples, the interrupt transfer request may correspond to a USB "IN" request. Host PAL 14 then modifies the size of USB transfer request to have a size that is multiple ("N") times the original size requested by USB host driver 12. Host network interface 16 then transmits the modified USB transfer request to peripheral network interface 26 over wireless communication link 18 (60).

By modifying the size of the USB transfer request, the corresponding USB response transfer response from wireless peripheral device 20 to host device 10 may include multiple USB transfer responses, rather than a single response transfer as USB host driver 12 originally requested.

Responsive to receiving the enlarged USB transfer response, peripheral network interface 26 transmits the transfer request to peripheral PAL 24, which decapsulates the transfer request, and transmits the transfer request to USB peripheral driver 22. USB peripheral driver 22 captures one or more events, such as mouse movements, and transmits the mouse movements to peripheral PAL 24. Responsive to receiving the transfer request, peripheral PAL 24, which is also configured in accordance with the techniques of this disclosure, is configured to aggregate and encapsulate multiple USB transfer responses corresponding to multiple captured events, e.g. mouse movements captured during period 62, into a single response transfer message. Peripheral network interface 26 then transmits the encapsulated aggregated transfer response message to network interface 16 of host device 10 (64).

Host PAL 14 receives the transfer response from host network interface 16. The transfer response includes the multiple USB transfer responses. Host PAL 14 decapsulates the multiple encapsulated USB transfer responses, and transmits them one at-a-time to USB host driver 12 (66). Responsive to receiving the multiple USB transfer responses from host PAL 14, USB host driver 12 may send a plurality of additional USB requests to host PAL 14, which host PAL 14 may ignore until host PAL 14 receives a transfer request from USB host driver 12 indicating that USB host driver 12 is ending USB interrupt transfer between host device 10 and wireless peripheral device 20.

In some examples, the size of the transfer request that host device 10 transmits to wireless peripheral device 20 may be, a certain number of slots. Each slot may correspond to a single USB transfer response. As an example, USB host device 10 may send a transfer request for 12 slots. However, wireless peripheral device 20 may not transmit a transfer response having a size of 12 slots, but rather may transmit three separate responses of 4 slots each. In some examples, host device 10 may adjust the requested size of the request transfer based on the round trip time between host device 10 and wireless peripheral device 20. As an example, if the round trip time between host device 10 and wireless peripheral device 20 is relatively larger, host device 10 may increase the transfer request size, and if the round trip time is relatively smaller, host device 10 may decrease the transfer request size.

After transferring the requested response size worth of encapsulated transfer responses, wireless peripheral device 20 may check the value of the most recently received transfer request from host device 10. If the value of the most recently received transfer request from host device 10 is equal to a certain value, for example negative one (−1), wireless peripheral device 20 may cease transmitting additional transfer responses to host device 10. However, if the most recently received transfer request from host device 10 is not equal to negative one, wireless peripheral device 20 may continue to transmit transfer responses, which encapsulate a plurality of USB transfer responses, to host device 10.

Additionally, because of the increased size of the transfer request that host device 10 sends to wireless peripheral device 20 (e.g. as illustrated in reference numeral 60), which causes wireless peripheral device 20 to send multiple transfer responses, host device 10 does not need to transmit additional transfer requests. Reducing the number of transfer requests that wireless peripheral device 20 receives before sending one or more transfer responses may also decrease the latency between wireless peripheral device 20 capturing an event, such as a mouse movement, and transmitting that event to host device 10 for processing.

In accordance with the techniques of this disclosure, host device 10 may be configured to receive, with host PAL 14, a Universal Serial Bus (USB) transfer request from USB host driver 12, modify, by host PAL 14, the USB transfer request, encapsulate, by host PAL 14, the modified USB transfer request for transmission via wireless communication link 18, transmit, by network interface 16, the encapsulated modified USB transfer request to wireless peripheral device 20 via wireless communication link 18, receive, by network interface 16, a transfer response that encapsulates a plurality of USB transfer responses from wireless peripheral device 20 via wireless communication link 18, decapsulate, by host PAL 14, the encapsulated transfer response, and transmit, by host PAL 14, each of the plurality of USB transfer responses to USB host driver 12.

In another example in accordance with the techniques of this disclosure, wireless peripheral device 20 may be configured to receive, by peripheral network interface 26, a transfer request that encapsulates a USB transfer request from host device 10 via wireless communication link 18, capture, by USB peripheral driver 22, a plurality of events, responsive to receiving the transfer request, encapsulate, by peripheral PAL 24, the plurality of captured events in a transfer response, and transmit, by peripheral network interface 26, the transfer response to host device 10 via wireless communication link 18.

Figure 4:
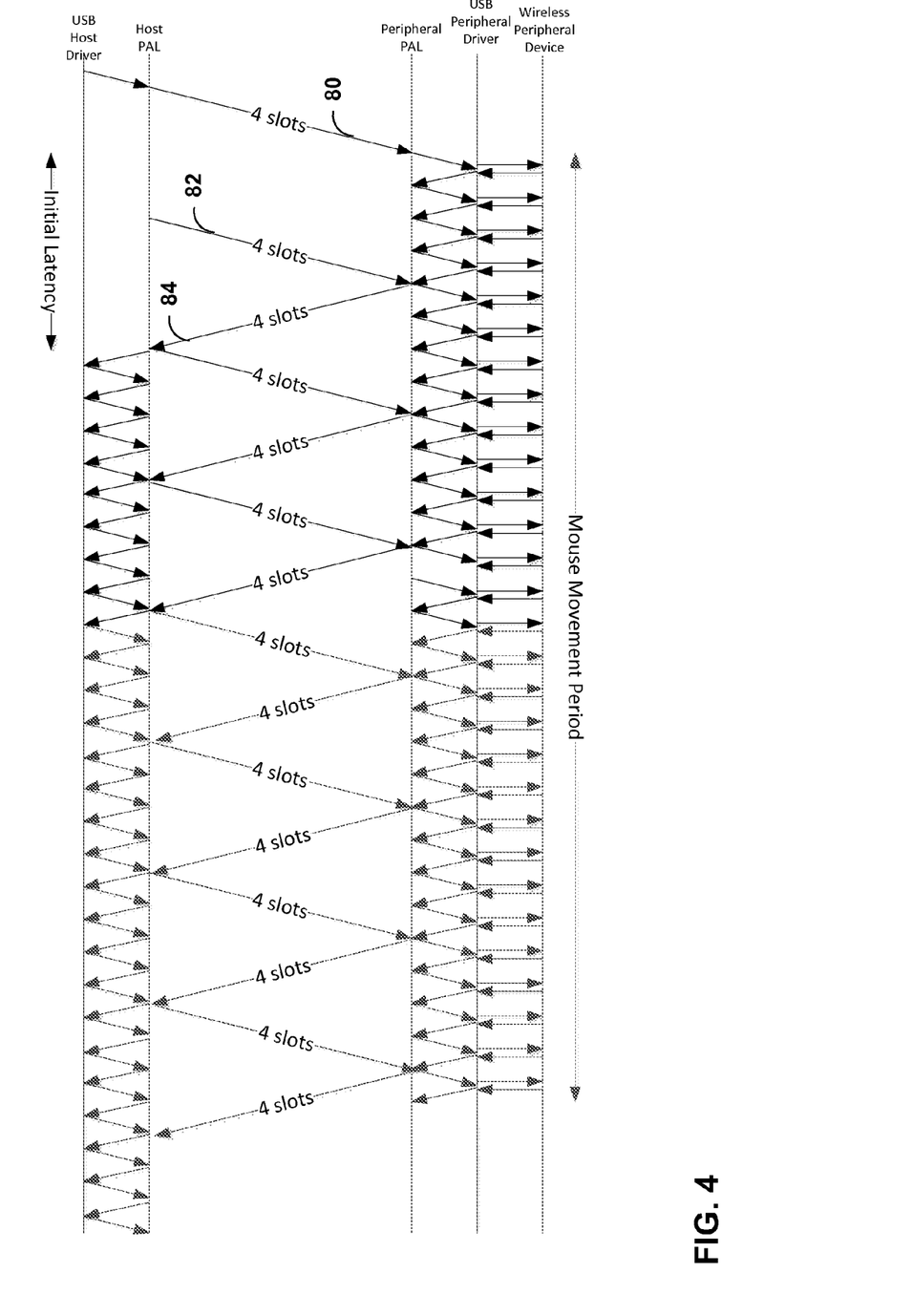
FIG. 4 is a conceptual diagram illustrating another technique for improving wireless USB interrupt mode transfers in accordance with the techniques of this disclosure.

FIG. 4 is a conceptual diagram illustrating another technique for improving wireless USB interrupt mode transfers in accordance with the techniques of this disclosure. Similar to the example of FIG. 3, in the example of FIG. 4, a host device, e.g. host device 10 of FIG. 1 is communicatively coupled to a peripheral device, e.g. wireless peripheral device 20 of FIG. 1. Wireless peripheral device 20 may comprise a peripheral device, such as a mouse. Host device 10 and wireless peripheral device 20 are communicatively coupled using a wireless communication link to transmit USB interrupt transfer mode data transfers between host device 10 and wireless peripheral device 20.

As described above with respect to FIG. 3, in the example of FIG. 4, a USB host driver, e.g., USB host driver 12 generates an interrupt transfer request, and transmits the transfer request to host PAL 14. Host PAL 14 then modifies the size of the USB transfer request to be a multiple ("N") times the original size requested by USB host driver 12. USB host device 10 transmits the modified (enlarged) USB transfer request to peripheral PAL 24 of wireless peripheral device 20 (80).

However, unlike the techniques illustrated above with respect to FIG. 3, host PAL 14 may generate, and network interface 16 may transmit a second transfer request of size N over communication link 18 to wireless peripheral device 20 before host device 10 receives the transfer response corresponding to the first transfer request (82). Host device 10 continues in the same manner, by transmitting a subsequent (or "second") transfer request to wireless peripheral device 20 such that the second transfer request is received by wireless peripheral device 20 just as wireless peripheral device 20 is transmitting a response to a previously-received (or "first") transfer request from host device 10.

In this manner, wireless peripheral device 20 receives the second transfer response just as wireless peripheral device 20 sends the transfer response corresponding to the first transfer request. When wireless peripheral device 20 receives the second transfer request just as wireless peripheral device 20 transmits the transfer response, wireless peripheral device 20 is able to continue to capture events, such as mouse movements, and to encapsulate, and transmit the encapsulated events to host device 10 without having to drop or buffer any events. The techniques illustrated in FIG. 4 contrast with those illustrated in FIG. 2, in which wireless peripheral device 20 transmits a transfer response, but has to wait some time interval for a subsequent transfer request before transmitting an additional transfer response. During the wait time, device wireless peripheral device 20 may drop or buffer captured events. Thus, the techniques of FIG. 4 offer an improvement over the prior art. The techniques of FIG. 4 may reduce or eliminate the need for wireless peripheral device 20 to drop or buffer captured events. The techniques of FIG. 4 may also reduce the latency between wireless peripheral device 20 capturing one or more events and transmitting the one or more events to host device 10.

In accordance with the techniques of this disclosure, host device 10 may be configured to receive, by host PAL 14, a Universal Serial Bus (USB) transfer request from USB host driver 12, modify, by host PAL 14, the USB transfer request, encapsulate, by host PAL 14, the modified USB transfer request for transmission via wireless communication link 18, transmit, by host network interface 16, the encapsulated modified USB transfer request to device wireless peripheral device 20 via wireless communication link 18, receive, by host network interface 16, a transfer response that encapsulates a plurality of USB transfer responses from wireless peripheral device 20 via wireless communication link 18, decapsulate, by host PAL 14, the encapsulated transfer response, and transmit, by host PAL 14, each of the plurality of USB transfer responses to USB host driver 12. In the example of FIG. 4, the modified transfer request comprises a first transfer request, and host device 10 is further configured to transmit a second transfer request to the wireless peripheral device before receiving the transfer response from the peripheral device.

In another example in accordance with the techniques of this disclosure, wireless peripheral device 20 may be configured to receive, by device network interface 26, a transfer request that encapsulates a USB transfer request from host device 10 via wireless communication link 18, capture, by USB peripheral driver 22, a plurality of events, responsive to receiving the transfer request, encapsulate, by peripheral PAL 24, the plurality of captured events in a transfer response, and transmit, by peripheral network interface 26, the transfer response to host device 10 via wireless communication link 18. In the example of FIG. 4, the transfer request from host device 10 comprises a first request, and wireless peripheral device 20 may receive a second transfer request from host device 10 before transmitting the transfer response to host device 10.

Figure 5:
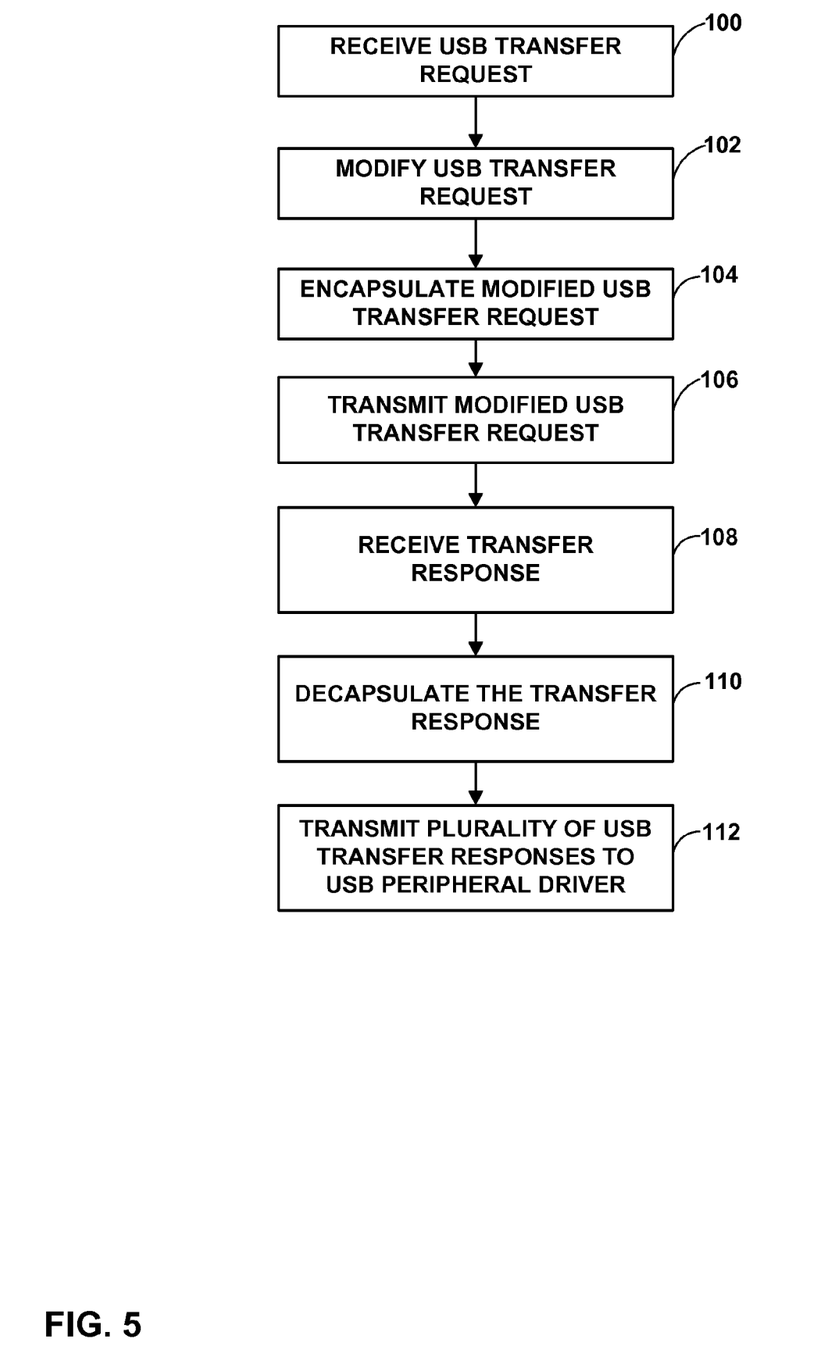
FIG. 5 is a flowchart illustrating a method for improving wireless USB interrupt mode transfers in accordance with the techniques of this disclosure.

FIG. 5 is a flowchart illustrating a method for improving wireless USB interrupt mode transfers in accordance with the techniques of this disclosure. For the purposes of example, a host device, such as host device 10, and a peripheral device, such as wireless peripheral device 20 of FIG. 1, may perform the techniques of the method illustrated in FIG. 5. In the method of FIG. 5, host device 10 may be configured to receive, by host PAL 14, a Universal Serial Bus (USB) transfer request from USB host driver 12 (100). Host PAL 14 may modify the USB transfer request (102). In some examples, modifying the transfer request comprises increasing a size of the transfer request.

Host PAL 14 may further encapsulate the modified USB transfer request for transmission via wireless communication link 18 (104). Network interface 16 of host device 10 transmits the encapsulated modified USB transfer request to wireless peripheral device 20 via wireless communication link 18 (106). Network interface 16 may receive a transfer response that encapsulates a plurality of USB transfer responses from wireless peripheral device 20 via wireless communication link 18 (108). In some examples, the wireless peripheral device comprises a mouse, and the plurality of USB transfer responses is indicative of mouse movements.

Host PAL 14 may decapsulate the encapsulated transfer response (110). Host PAL 14 may transmit each of the plurality of USB transfer responses to USB host driver 12 (112). In some examples, to transmit each of the plurality of transfer responses to USB host driver 12, host device 10 may transmit each of the plurality of USB transfer responses to USB host driver 12 responsive to receiving a transfer request from USB host driver 12.

In some examples, the modified transfer request comprises a first transfer request, and host device 10 may be further configured to transmit a second transfer request to wireless peripheral device 20 before receiving the transfer response from wireless peripheral device 20.

In some examples, the transfer request comprises a USB interrupt transfer request, and the transfer response comprises a USB interrupt transfer response. Additionally, encapsulating the transfer request may comprise encapsulating the modified USB transfer request in an IEEE 802.11ac format, and decapsulating the transfer response comprises decapsulating the transfer response from an IEEE 802.11ac format to a USB format.

In yet some other examples, host device 10 may continue to receive additional transfer responses comprising additional pluralities of USB transfer responses from wireless peripheral device 20 via wireless communication link 18, and transmit a transfer request indicating that wireless peripheral device 20 should refrain from sending transfer responses to the host device via the wireless communication link.

Figure 6:
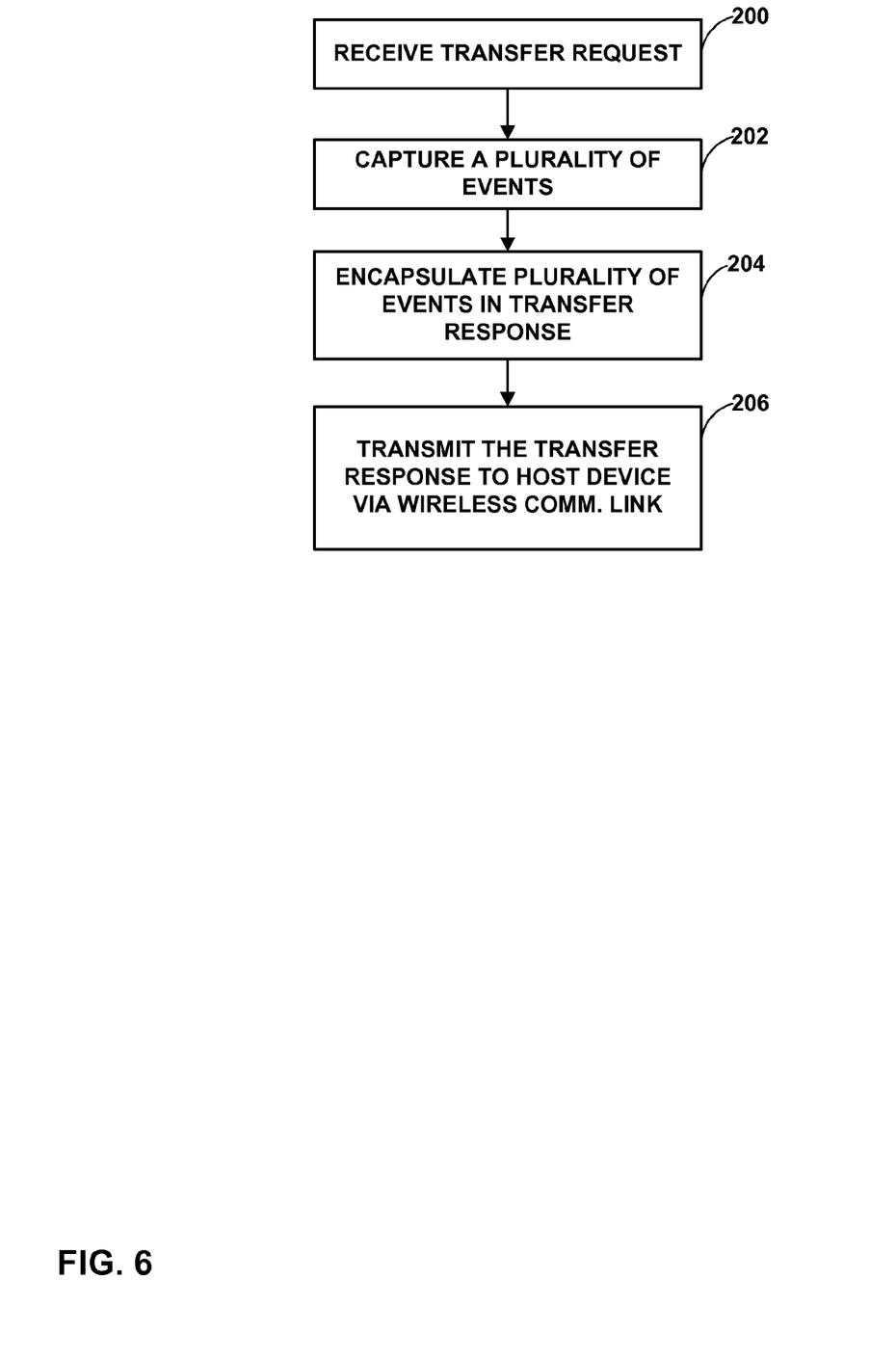
FIG. 6 is a flowchart illustrating a method for improving wireless USB interrupt mode transfers in accordance with the techniques of this disclosure.

FIG. 6 is a flowchart illustrating a method for improving wireless USB interrupt mode transfers in accordance with the techniques of this disclosure. For the purposes of example, the techniques illustrated with respect to FIG. 6 may be performed by a peripheral device, such as wireless peripheral device 20 of FIG. 1. In some examples, wireless peripheral device 20 may comprise a mouse. In the method illustrated in FIG. 6, wireless peripheral device 20 may be configured to receive, by peripheral network interface 26, a transfer request that encapsulates a USB transfer request from host device 10 via wireless communication link 18 (200). USB peripheral driver 22 of wireless peripheral device 20 may capture a plurality of events, responsive to receiving the transfer request (202). In some examples, the transfer request received from host device 10 has a size that corresponds to the number of the plurality of captured events.

Peripheral PAL 24 may encapsulate the plurality of captured events in a transfer response (204). Peripheral network interface 26 may transmit the transfer response to host device 10 via wireless communication link 18 (206). In some examples, the transfer request from host device 10 comprises a first request, and wireless peripheral device 20 may receive a second transfer request from host device 10 before transmitting the transfer response to host device 10.

In some examples, the plurality of events comprises a first plurality of events, and the transfer request comprises a first transfer request. The method of FIG. 6 may further include continuing to capture, with the wireless peripheral device 20, additional pluralities of events. Wireless peripheral device 20 may transmit the additional captured pluralities of events to host device 10 on a periodic basis until wireless peripheral device 20 receives a transfer request indicating the wireless peripheral device is to refrain from transmitting the additional pluralities of captured events.

In some examples, the transfer request includes a USB interrupt transfer request, and wherein the response includes a plurality of USB interrupt transfer response events. Wireless communication link 18 may also comprise an IEEE 802.11ac communication link, and the captured events may be indicative of mouse movements in some examples.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
receiving, by a host device, a Universal Serial Bus (USB) transfer request from a USB host driver;
modifying, by the host device, the USB transfer request, wherein modifying the transfer request comprises increasing a size of the transfer request;
encapsulating, by the host device, the modified USB transfer request for transmission via a wireless communication link;
transmitting, by the host device, the encapsulated modified USB transfer request to a wireless peripheral device via the wireless communication link;
receiving, by the host device, a transfer response that encapsulates a plurality of USB transfer responses from the wireless peripheral device via the wireless communication link;
decapsulating, by the host device, the encapsulated transfer response; and
transmitting, by the host device, each of the plurality of USB transfer responses to the USB host driver.

2. The method of claim 1, wherein the modified transfer request comprises a first transfer request, the method further comprising:
transmitting, by the host device, a second transfer request to the wireless peripheral device before receiving the transfer response from the peripheral device.

3. The method of claim 1, wherein the transfer request comprises a USB interrupt transfer request, and wherein the transfer response comprises a USB interrupt transfer response.

4. The method of claim 1, wherein the wireless communication link comprises an institute of electrical and electronics engineers (IEEE) 802.11 ac communication link,
wherein encapsulating the transfer request comprises encapsulating the modified USB transfer request in an 802.11 ac format,
wherein decapsulating the transfer response comprises decapsulating the transfer response from an 802.11ac format to a USB format.

5. The method of claim 1, wherein transmitting each of the plurality of USB transfer responses to the USB host driver further comprises:
transmitting, by the host device, each of the plurality of USB transfer responses to the USB host driver responsive to receiving a transfer request from the USB host driver.

6. The method of claim 1, further comprising:
continuing to receive additional transfer responses comprising additional pluralities of USB transfer responses from the wireless peripheral device via the wireless communication link; and
transmitting, by the host device, a transfer request indicating that the wireless peripheral device should refrain from sending transfer responses to the host device via the wireless communication link.

7. The method of claim 1, wherein the wireless peripheral device comprises a mouse, and wherein the plurality of USB transfer responses is indicative of mouse movements.

8. A method comprising:
receiving, by a wireless peripheral device, a transfer request that encapsulates a USB transfer request from a host device via a wireless communication link;
capturing, by the wireless peripheral device, a plurality of events responsive to receiving the transfer request;
encapsulating, by the wireless peripheral device, the plurality of captured events in a transfer response; and
transmitting, by the wireless peripheral device, the transfer response to a host device via a wireless communication link.

9. The method of claim 8, wherein the transfer request from the host device comprises a first request, the method further comprising:
receiving, by the wireless peripheral device, a second transfer request from the host device before transmitting the transfer response to the host device.

10. The method of claim 8, wherein the plurality of events comprises a first plurality of events, and the transfer request comprises a first transfer request, the method further comprising:
continuing to capture, by the wireless peripheral device, additional pluralities of events and transmit the additional captured pluralities of events to the host device on a periodic basis until the wireless peripheral device receives a transfer request indicating the wireless peripheral device is to refrain from transmitting the additional pluralities of captured events.

11. The method of claim 8, wherein the transfer request received from the host device has a size that corresponds to a number of the plurality of captured events.

12. The method of claim 8, wherein the transfer request includes a USB interrupt transfer request, and wherein the response includes a plurality of USB interrupt transfer response events.

13. The method of claim 8, wherein the wireless communication link comprises an institute of electrical and electronics engineers (IEEE) 802.11 ac communication link.

14. The method of claim 8, wherein the wireless peripheral device comprises a mouse, and
wherein the captured events are indicative of mouse movements.

15. A host device comprising:
means for receiving, by the host device, a Universal Serial Bus (USB) transfer request from a USB host driver;
means for modifying, by the host device, the USB transfer request, wherein the means for modifying the transfer request comprises means for increasing a size of the transfer request;
means for encapsulating, by the host device, the modified USB transfer request for transmission via a wireless communication link;
means for transmitting, by the host device, the encapsulated modified USB transfer request to a wireless peripheral device via the wireless communication link;

means for receiving, by the host device, a transfer response that encapsulates a plurality of USB transfer responses from the wireless peripheral device via the wireless communication link;

means for decapsulating, by the host device, the encapsulated transfer response; and means for transmitting, by the host device, each of the plurality of USB transfer responses to the USB host driver.

16. The device of claim 15, wherein the modified transfer request comprises a first transfer request, the apparatus further comprising:

means for transmitting, by the host device, a second transfer request to the wireless peripheral device before receiving the transfer response from the wireless peripheral device.

17. The device of claim 15, wherein the transfer request comprises a USB interrupt transfer request, and wherein the transfer response comprises a USB interrupt transfer response.

18. The device of claim 15, wherein the wireless communication link comprises an institute of electrical and electronics engineers (IEEE) 802.11ac communication link, wherein the means for encapsulating the transfer request comprises means for encapsulating the modified USB transfer request in an 802.11ac format, wherein the means for decapsulating the transfer response comprises means for decapsulating the transfer response from an 802.11 ac format to a USB format.

19. The device of claim 15, wherein the means for transmitting each of the plurality of USB transfer responses to the USB host driver further comprises:

means for transmitting, by the host device, each of the plurality of USB transfer responses to the USB host driver responsive to receiving a transfer request from the USB host driver.

20. The device of claim 15, further comprising:

means for continuing to receive additional transfer responses comprising additional pluralities of USB transfer responses from the wireless peripheral device via the wireless communication link; and means for transmitting, with the host device, a transfer request indicating that the wireless peripheral device should refrain from sending transfer responses to the host device via the wireless communication link.

21. The device of claim 15, wherein the wireless peripheral device comprises a mouse, and wherein the plurality of USB transfer responses is indicative of mouse movements.

22. A wireless peripheral device comprising:

means for receiving, by the wireless peripheral device, a transfer request that encapsulates a USB transfer request from a host device via a wireless communication link;

means for capturing, by the wireless peripheral device, a plurality of events, responsive to receiving the transfer request;

means for encapsulating, by the wireless peripheral device, the plurality of captured events in a transfer response; and means for transmitting, by the wireless peripheral device, the transfer response to a host device via a wireless communication link.

23. The device of claim 22, wherein the transfer request from the host device comprises a first request, the wireless peripheral device further comprising:

means for receiving, by the wireless peripheral device, a second transfer request from the host device before transmitting the transfer response to the host device.

24. The device of claim 22, wherein the plurality of events comprises a first plurality of events, and the transfer request comprises a first transfer request, the wireless peripheral device further comprising:

means for continuing to capture, by the wireless peripheral device, additional pluralities of events and transmit the additional captured pluralities of events to the host device on a periodic basis until the wireless peripheral device receives a transfer request indicating the wireless peripheral device is to refrain from transmitting the additional pluralities of captured events.

25. The device of claim 22, wherein the transfer request received from the host device has a size that corresponds to a number of the plurality of captured events.

26. The device of claim 22, wherein the transfer request includes a USB interrupt transfer request, and wherein the response includes a plurality of USB interrupt transfer response events.

27. The device of claim 22, wherein the wireless communication link comprises an institute of electrical and electronics engineers (IEEE) 802.11 ac communication link.

28. The device of claim 22, wherein the wireless peripheral device comprises a mouse, and wherein the captured events are indicative of mouse movements.

29. A host device comprising:

at least one processor;

a universal serial bus (USB) host driver;

a protocol adaptation layer (PAL); and a network interface communicatively coupled to a wireless communication link, wherein the host device is configured to:

receive, by the PAL, a Universal Serial Bus (USB) transfer request from the USB host driver;

modify, by the PAL, the USB transfer request, wherein to modify the transfer request, the PAL is further configured to increase a size of the transfer request;

encapsulate, by the PAL, the modified USB transfer request for transmission via the wireless communication link;

transmit, by the network interface, the encapsulated modified USB transfer request to a wireless peripheral device via the wireless communication link;

receive, by the network interface, a transfer response that encapsulates a plurality of USB transfer responses from the wireless peripheral device via the wireless communication link;

decapsulate, by the PAL, the encapsulated transfer response; and transmit, by the PAL, each of the plurality of USB transfer responses to the USB host driver.

30. The device of claim 29, wherein the transfer request comprises a USB interrupt transfer request, and wherein the transfer response comprises a USB interrupt transfer response.

31. The device of claim 29, wherein the wireless communication link comprises an institute of electrical and electronics engineers (IEEE) 802.11 ac communication link, wherein to encapsulate the transfer request, the PAL is further configured to encapsulate the modified USB transfer request in an institute of electrical and electronics engineers (IEEE) 802.11ac format, wherein to decapsulate the transfer response, the PAL is further configured to decapsulate the transfer response from an institute of electrical and electronics engineers (IEEE) 802.11 ac format to a USB format.

32. The device of claim 29, wherein transmitting each of the plurality of USB transfer responses to the USB host driver further comprises:
  transmitting, by the host device, each of the plurality of USB transfer responses to the USB host driver responsive to receiving a transfer request from the USB host driver.

33. The device of claim 29, wherein the host device is further configured to:
  continue to receive, by the network interface, additional transfer responses comprising additional pluralities of USB transfer responses from the wireless peripheral device via the wireless communication link; and
  transmit, by the network interface, a transfer request indicating that the wireless peripheral device should refrain from sending transfer responses to the host device via the wireless communication link.

34. The device of claim 29, wherein the wireless peripheral device comprises a mouse, and wherein the plurality of USB transfer responses is indicative of mouse movements.

35. A wireless peripheral device comprising:
  at least one processor;
  a universal serial bus (USB) device controller;
  a protocol adaptation layer (PAL);
  a network interface communicatively coupled to a wireless communication link, wherein the wireless peripheral device is configured to:
  receive, by the network interface, a transfer request that encapsulates a USB transfer request from a host device via the wireless communication link;
  capture, by the USB device controller, a plurality of events, responsive to receiving the transfer request;
  encapsulate, by the PAL, the plurality of captured events in a transfer response; and
  transmit, by the network interface, the transfer response to a host device via a wireless communication link.

36. The device of claim 35, wherein the transfer request from the host device comprises a first request, wherein the wireless peripheral device is further configured to:
  receive, by the network interface, a second transfer request from the host device before transmitting the transfer response to the host device.

37. The device of claim 35, wherein the plurality of events comprises a first plurality of events, and the transfer request comprises a first transfer request, wherein the wireless peripheral device is further configured to:
  continue to capture, by the network interface, additional pluralities of events and transmit the additional captured pluralities of events to the host device on a periodic basis until the wireless peripheral device receives a transfer request indicating the wireless peripheral device is to refrain from transmitting the additional pluralities of captured events.

38. The device of claim 35, wherein the transfer request received from the host device has a size that corresponds to a number of the plurality of captured events.

39. The device of claim 35, wherein the transfer request includes a USB interrupt transfer request, and wherein the response includes a plurality of USB interrupt transfer response events.

40. The device of claim 35, wherein the wireless communication link comprises an institute of electrical and electronics engineers (IEEE) 802.11 ac communication link.

41. The device of claim 35, wherein the wireless peripheral device comprises a mouse, and wherein the captured events are indicative of mouse movements.

42. A non-transitory computer readable storage medium comprising instructions stored thereon that, when executed, cause one or more processors of a host device to:
  receive, by the host device, a Universal Serial Bus (USB) transfer request from a USB host driver;
  modify, by the host device, the USB transfer request, wherein the instructions that cause the one or more processors to modify the transfer request further comprise instructions that, when executed, cause the one or more processors to increase a size of the transfer request;
  encapsulate, by the host device, the modified USB transfer request for transmission via a wireless communication link;
  transmit, by the host device, the encapsulated modified USB transfer request to a wireless peripheral device via the wireless communication link;
  receive, by the host device, a transfer response that encapsulates a plurality of USB transfer responses from the wireless peripheral device via the wireless communication link; and
  decapsulate, by the host device, the encapsulated transfer response; and transmit, by the host device, each of the plurality of USB transfer responses to the USB host driver.

43. The non-transitory computer-readable storage medium of claim 42, wherein the modified transfer request comprises a first transfer request, further comprising instructions, that when executed, cause the one or more processors to:
  transmit, by the host device, a second transfer request to the wireless peripheral device before receiving the transfer response from the peripheral device.

44. The non-transitory computer-readable storage medium of claim 42, wherein the transfer request comprises a USB interrupt transfer request, and wherein the transfer response comprises a USB interrupt transfer response.

45. The non-transitory computer-readable storage medium of claim 42, wherein the wireless communication link comprises an institute of electrical and electronics engineers (IEEE) 802.11 ac communication link,
  wherein the instructions that cause the one or more processors to encapsulate the transfer request further comprise instructions that, when executed, cause the one or more processors to encapsulate the modified USB transfer request in an institute of electrical and electronics engineers (IEEE) 802.11 ac format,
  wherein the instructions that cause the one or more processors to decapsulate the transfer response further comprise instructions that, when executed, cause the one or more processors to decapsulate the transfer response from an institute of electrical and electronics engineers (IEEE) 802.11ac format to a USB format.

46. The non-transitory computer-readable storage medium of claim 42, wherein the instructions that cause the one or more processors to transmit each of the plurality of USB transfer responses to the USB host driver further comprise instructions that, when executed, cause the one or more processors to:
  transmit each of the plurality of USB transfer responses to the USB host driver responsive to receiving a transfer request from the USB host driver.

47. The non-transitory computer-readable storage medium of claim 42, further comprising instructions that, when executed, cause the one or more processors to:
  continue to receive additional transfer responses comprising additional pluralities of USB transfer responses from the wireless peripheral device via the wireless communication link; and transmit, a transfer request indicating that the wireless peripheral device should refrain from sending transfer responses to the host non-transitory computer-readable storage medium via the wireless communication link.

48. The non-transitory computer-readable storage medium of claim 42, wherein the wireless peripheral device comprises a mouse, and wherein the plurality of USB transfer responses is indicative of mouse movements.

49. A non-transitory computer readable storage medium comprising instructions stored thereon that, when executed, cause one or more processors to:
- receive, by a wireless peripheral device, a transfer request that encapsulates a USB transfer request from a host device via a wireless communication link;
- capture, by the wireless peripheral device, a plurality of events, responsive to receiving the transfer request;
- encapsulate, by the wireless peripheral device, the plurality of captured events in a transfer response; and
- transmit, by the wireless peripheral device, the transfer response to a host device via a wireless communication link.

50. The non-transitory computer-readable storage medium of claim 49, wherein the transfer request from the host device comprises a first request, further comprising instructions that cause the one or more processors to:
- receive, by the wireless peripheral device, a second transfer request from the host device before transmitting the transfer response to the host device.

51. The non-transitory computer-readable storage medium of claim 49,
- wherein the plurality of events comprises a first plurality of events, and the transfer request comprises a first transfer request, further comprising instructions that cause the one or more processors to:
- continue to capture, by the wireless peripheral device, additional pluralities of events; and
- transmit the additional captured pluralities of events to the host device on a periodic basis until the wireless peripheral device receives a transfer request indicating the wireless peripheral device is to refrain from transmitting the additional pluralities of captured events.

52. The non-transitory computer-readable storage medium of claim 49, wherein the transfer request received from the host device has a size that corresponds to a number of the plurality of captured events.

53. The non-transitory computer-readable storage medium of claim 49, wherein the transfer request includes a USB interrupt transfer request, and wherein the response includes a plurality of USB interrupt transfer response events.

54. The non-transitory computer-readable storage medium of claim 49, wherein the wireless communication link comprises an institute of electrical and electronics engineers (IEEE) 802.11 ac communication link.

55. The non-transitory computer-readable storage medium of claim 49, wherein the wireless peripheral device comprises a mouse, and wherein the captured events are indicative of mouse movements.

56. A host device comprising:
- at least one processor;
- a universal serial bus (USB) host driver;
- a protocol adaptation layer (PAL); and
- a network interface communicatively coupled to a wireless communication link,
- wherein the host device is configured to:
- receive, by the PAL, a Universal Serial Bus (USB) transfer request from the USB host driver for data from a peripheral device;
- encapsulate, by the PAL, the USB transfer request for transmission via the wireless communication link;
- transmit, by the network interface, the encapsulated USB transfer request to a wireless peripheral device via the wireless communication link,
- transmit, by the network interface, a second transfer request to the wireless peripheral device for data from the peripheral device before receiving a transfer response from the peripheral device;
- receive, by the network interface, the transfer response that encapsulates a plurality of USB transfer responses from the wireless peripheral device via the wireless communication link;
- decapsulate, by the PAL, the encapsulated transfer response; and
- transmit, by the PAL, each of the plurality of USB transfer responses to the USB host driver.

\* \* \* \* \*